May 3, 1960 E. A. THOMPSON 2,935,059
COMPOSITE VALVE TAPPET ASSEMBLY
Filed Sept. 5, 1958 4 Sheets-Sheet 2

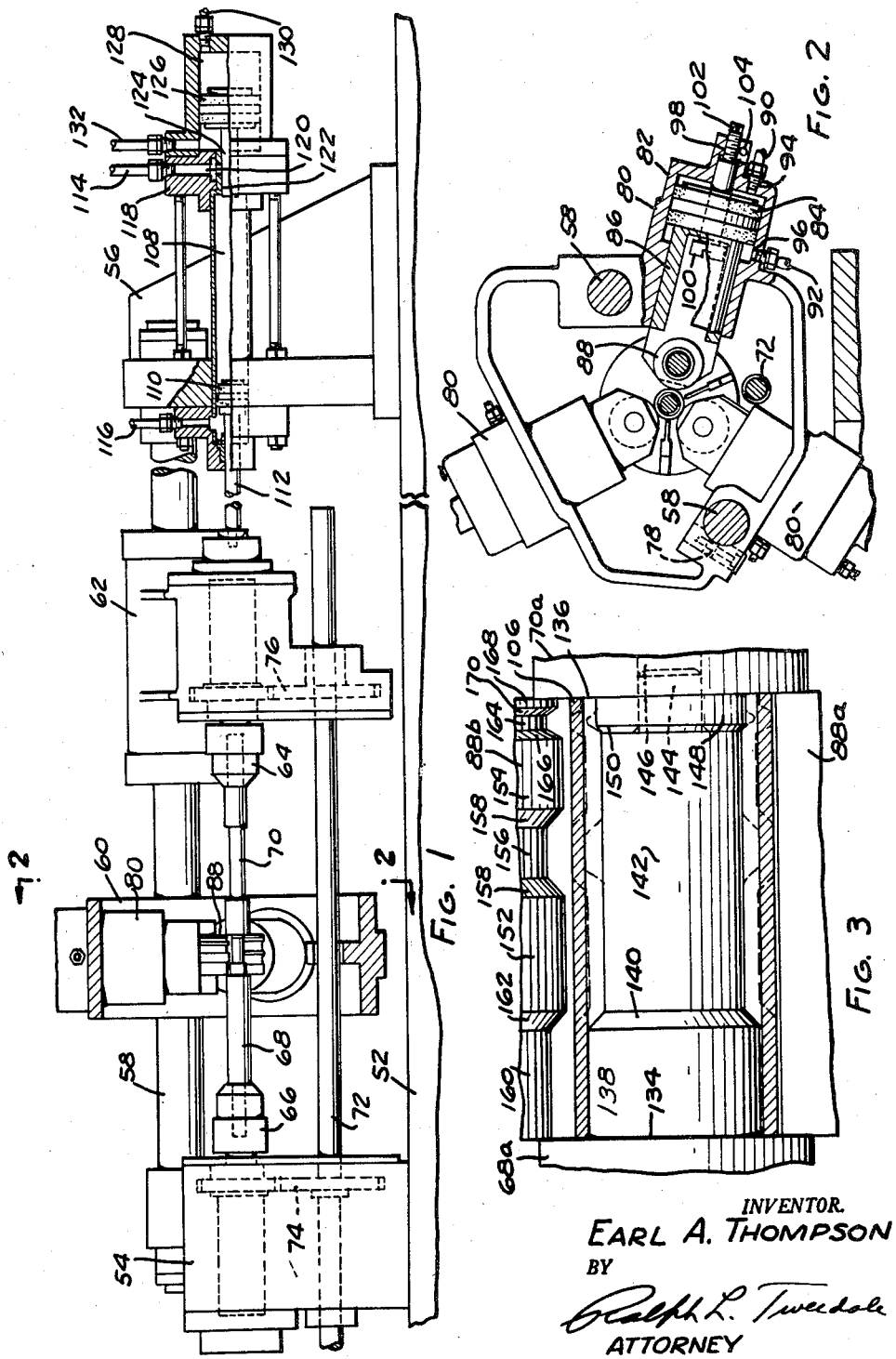

INVENTOR.
EARL A. THOMPSON
BY
Ralph L. Tweedale
ATTORNEY

May 3, 1960      E. A. THOMPSON      2,935,059
COMPOSITE VALVE TAPPET ASSEMBLY

Filed Sept. 5, 1958      4 Sheets-Sheet 3

INVENTOR.
EARL A. THOMPSON
BY
*Ralph L. Truesdell*
ATTORNEY

May 3, 1960 E. A. THOMPSON 2,935,059
COMPOSITE VALVE TAPPET ASSEMBLY
Filed Sept. 5, 1958 4 Sheets-Sheet 4

INVENTOR.
EARL A. THOMPSON
BY
ATTORNEY

United States Patent Office 2,935,059
Patented May 3, 1960

2,935,059

COMPOSITE VALVE TAPPET ASSEMBLY

Earl A. Thompson, Ferndale, Mich.

Application September 5, 1958, Serial No. 764,208

8 Claims. (Cl. 123—90)

This application is a continuation-in-part of co-pending application Serial No. 556,892, filed January 3, 1956.

This invention relates to a valve tappet.

A tappet is an element adapted to be located between an operator such as a cam and a push rod for operating a poppet valve of an internal combustion engine.

The present invention is concerned particularly with the construction of a valve tappet of the hydraulic type and especially by a method which is more economical than methods currently being used.

A valve tappet usually includes an outer tubular body member and an inner tubular plunger member, which members are so designed and assembled as to trap hydraulic fluid therebetween and thus form an operative connection between the cam of the engine and the push rod. Heretofore, various methods have been employed for the manufacture of such tappets. Usually, the body and plunger of the tappet are formed from castings or solid bar stock. This requires extensive machining and grinding operations. Recently, it has been proposed to form such tappets from tubular blanks having wall thicknesses sufficient to enable machining these members to their proper shape and dimensions. The tubular blanks are cut from seamless tubing or welded tubing; and since these members in the finished form usually have end caps welded thereto, the steel employed is of a low carbon content; namely S.A.E 1010 or 1020. With such steels, it is difficult to produce a smooth finish by conventional machining operations; and thus, expensive grinding operations must be resorted to to obtain the desired finish. In addition, seamless steel tubing is not usually concentric to within a few thousandths of an inch; and therefore, excessive material must be removed by grinding. Grinding, and especially internal grinding, is an expensive operation, not only from the standpoint of time consumed but also from the standpoint of capital investment. In the case of welded tubing, problems arise in connection with removing the weld flash from both the inside and the outside of the tube.

The present invention contemplates a method for making valve tappets wherein very little machining is required and wherein the amount of grinding that is necessary is reduced to an absolute minimum.

More specifically, the invention contemplates a method of making tappet bodies and plungers wherein the necessary configuration of the side wall of the work piece is produced by a rolling operation rather than by a machining operation. Thus, closer tolerances can be obtained than is the case with machining and the necessity for leaving sufficient clean-up stock to remove tool marks inevitable with machining is eliminated. At the same time, the rolling operation is performed in a manner and by such apparatus that the necessity for producing a smooth finish on some surfaces by grinding is entirely eliminated and the grinding of other surfaces is reduced to a minimum.

A further object of the invention resides in the provision of a novel apparatus for forming such valve tappets very economically and at a very high rate of production.

A further object of the invention is to provide a valve tappet which is of reliable construction and which is designed so that it can be manufactured economically.

In the drawings:

Fig. 1 is a side elevation partly in section of an apparatus for making valve tappets in accordance with the present invention.

Fig. 2 is a sectional view along the line 2—2 in Fig. 1.

Fig. 3 shows one arrangement of rollers usable in the apparatus shown in Fig. 1 for rolling the outer body member of the tappet.

Figure 9:
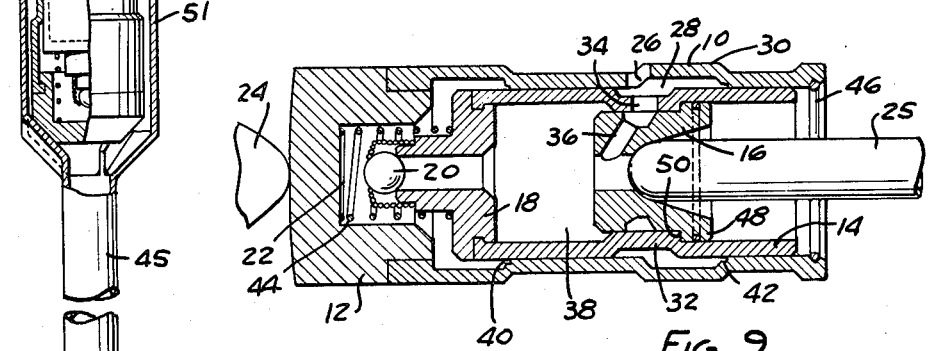
Fig. 9 shows the assembled valve tappet in axial section.

Referring particularly to Fig. 9, there is illustrated a valve tappet constructed in accordance with the method and apparatus shown in Figs. 1 through 8. The tappet includes an outer body 10 having a cast iron base 12 welded to one end thereof. Within body 10, there is arranged a plunger 14 which receives a push rod seat 16. Plunger 14 has valve fitting 18 welded to one end thereof, and fitting 18 is fashioned with a check valve 20. Valve 20 controls the admission of hydraulic fluid to the pressure chamber 22 between body 10 and plunger 14. In operation, a plurality of these valve tappet assemblies, one for each poppet valve of the engine, are located in bores formed in the engine block and arranged so that the cams 24 operate against the end face of base 12 and the push rods 25 that actuate the rocker arms are seated in the caps 16. Oil under ordinary engine pressure is admitted to the body 10 through the opening 26. From the opening 26, the oil flows into the annular chamber 28 formed by the annular enlargement 30 on body 10 and the circumferential groove 32 on plunger 14. The oil then flows through the openings 34 and 36 in plunger 14 and seat 16, respectively, and into the chamber 38. When base 12 rides over the low side of the engine cam, the pressure of the oil in pressure chamber 22 decreases and the oil in chamber 38 unseats valve 20 and replenishes the oil which may have leaked from chamber 22. For smooth and dependable operation of this tappet assembly, there must be a relatively close fit between the outer cylindrical surface of plunger 14 and the inner cylindrical surface of body 10. To prevent sticking or freezing of plunger 14 in body 10, the body is counterbored as at 40 and 42 to provide relatively sharp edges for scraping from the outer surface of plunger 14 any varnish or dirt that may accumulate.

Plunger 14 is biased outwardly of body 10 by a compression spring 44 in chamber 22. The extent of outward movement of plunger 14 in body 10 is limited by a split ring retainer 46. Seat 16 is telescoped into plunger 14 with a fairly close fit and is located in position by the interengagement of the annular flange 48 on seat 16 with the square shoulder 50 formed on the inside of the groove portion 32 of plunger 14.

Figure 10:
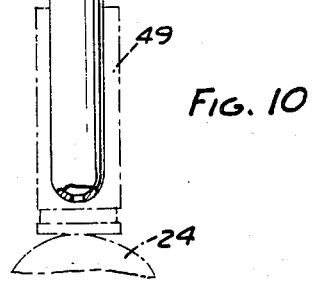
Fig. 10 shows one manner in which a tappet constructed in accordance with the present invention may be used.

In the arrangement shown in Fig. 9, as pointed out previously, the tappet assembly is located between the cam 24 and the push rod 25. If desired, the tappet assembly may be arranged between a hollow push rod such as designated at 45 in Fig. 10 and the rocker arm 47. Push rod 45 is provided with an outer sleeve 49 at the lower end thereof which seats on cam 24. At its upper end, push rod 45 is formed with an enlarged portion 51 in which the tappet assembly is arranged. In place of the seat 16 shown in Fig. 9, a modified form of seat 53 is employed having an axial hollow extension 55 which engages with the end of rocker arm 47. The operation of the arrangement shown in Fig. 10 is substantially the same as that shown in Fig. 9.

Body 10 and plunger 14 are adapted to be fashioned to substantially the cross section shown in Fig. 9 by the rolling apparatus shown in Fig. 1. This apparatus includes a base 52 on which are fixedly mounted a support 54 at one end and a support 56 at the other end. A plurality of parallel cylindrical guide rails 58 extend between and are secured at their opposite ends to supports 54 and 56. Rails 58 slidably support a roll housing or head 60 and a spindle housing 62. Within housing 62, there is rotatably supported a spindle 64. A spindle 66 is also journalled in support 54 in axial alignment with spindle 64. Arbors 68 and 70 are socketed in spindles 66 and 64, respectively. Spindles 66 and 64 are positively driven in the same direction and at the same time and at the same speed through a splined drive shaft 72. A set of gears 74 connect shaft 72 with spindle 66, and a set of gears 76 connect shaft 72 with spindle 64. Since, as explained hereinafter, in operation, housing 62 is shifted axially toward and away from support 54, shaft 72 has a splined sliding connection with gear set 76.

Referring more particularly to Fig. 2, head 60 comprises a casting which is supported for sliding movement on rails 58 and is arranged to be locked in fixed position on these rails by means of one or more tangent screws 78. Head 60 includes a plurality of radially disposed piston-cylinder assemblies 80 arranged circumferentially around arbors 68 and 70. In the apparatus illustrated, three such piston-cylinder assemblies are provided. Each includes an outer cylinder 82 in which is arranged a piston 84. Each piston 84 has a tubular plunger 86 fixedly connected thereto and each plunger has a roll 88 journalled for rotation at the outer end thereof on an axis parallel to the axes of arbors 68 and 70. Means not illustrated are provided for moving pistons 84 in cylinders 82 in a controlled manner so as to shift the rolls 88 radially inwardly and outwardly with respect to arbors 68 and 70. The means for actuating pistons 84 are preferably in the form of hydraulic control mechanism of the type having a shaft having a plurality of cams thereon which, when rotated, actuate plungers that displace fluid in conduits 90 and 92. Conduits 90 are connected with the ports 94 and conduits 92 are connected with the ports 96 of cylinders 82. When hydraulic fluid is admitted to the ports 94, the pistons 84 are urged radially inwardly toward arbors 68 and 70; and when fluid is exhausted from the cylinders through ports 94 and admitted through ports 96, pistons 84 are retracted. The control means for pistons 84 are designed so that the pistons are controlled individually during their radially inward movement; that is, on the feed stroke, and are retracted simultaneously. For reasons which will be hereinafter explained, it is important that the extent to which rolls 88 are permitted to move radially inwardly must be very accurately controlled; and for this purpose, there is provided a step in the form of a screw 98 having a head 100 adapted to engage the bottom of plungers 86 when the plungers move in a radially inward direction. Screw 98 has a threaded connection with the outer end of cylinder 82, and the portion of the screw 98 which projects out of cylinder 80 is fashioned with a square end 102 to facilitate adjustment of the screw inwardly and outwardly of the cylinder. Screw 98 is arranged to be locked in its adjusted position by a clamping screw 104.

To facilitate loading of a tubular blank 106 on arbors 68 and 70, head 62 is adapted to be shifted toward and away from support 54. The means for actuating head 62 in this manner include a cylinder 108 in which operates a piston 110 having a rod 112 connected with head 62 (Fig. 1). Hydraulic fluid is arranged to be introduced into cylinder 108 on one side of piston 110 through a conduit 114 and to the other side of piston 110 through a conduit 116. Conduit 114 is connected with a housing 118 having a passageway 120 therein. Passageway 120 communicates with cylinder 108 through a bore 122. Within bore 122, there is arranged a slidable plunger 124 which is connected with an intensifier piston 126 that operates in cylinder 128. Hydraulic fluid is arranged to be admitted to cylinder 128 on opposite sides of piston 126 through conduits 130 and 132.

In operation, with the head 62 in the retracted position, a tubular blank 106 is arranged on arbor 68 and head 62 is then shifted to the left as viewed in Fig. 1 to clamp the work piece between arbors 68 and 70. To shift head 62 to the left, oil is fed into cylinder 108 through conduit 114 and into cylinder 128 through conduit 130. The arrangement is such that a relatively small quantity of oil need be fed into cylinder 108 to shift piston 110 to a position wherein the work piece 106 is clamped between arbors 68 and 70. As piston 110 approaches the end of its stroke, a sufficient quantity of oil has been introduced through conduit 130 into cylinder 128 to cause plunger 122 to close passageway 120; and thus, the relative cross sectional areas of piston 126 and plunger 124 result in a relatively high pressure being applied to the oil in cylinder 108 so as to firmly clamp the work piece 106 on arbors 68 and 70. The actuation of head 62, that is, the control of the admission of oil to cylinders 128 and 108, is preferably controlled by a hydraulic control mechanism of suitable construction, not shown.

Referring now to Fig. 3 wherein one form of rolls for rolling the body 10 to the desired configuration is illustrated, it will be noted that the arbors, designated 68a and 70a, are fashioned with shoulders 134 and 136, respectively, for engaging the opposite ends of the tubular blank 106 and thus effectively clamp the blank therebetween so that the blank will be positively rotated by the arbors. Shoulders 134 and 136 also prevent the blank from elongating when subjected to the rolling operation. Arbor 68a is fashioned with a cylindrical portion 138 having a relatively close fit with the inside of blank 106. The cylindrical portion 138 is connected by a shoulder 140 with a reduced cylindrical portion 142. The free end of portion 142 is formed with a pilot 144 which telescopes into an opening 146 in the end of arbor 70a. Adjacent shoulder 136, arbor 70a is fashioned with a cylindrical portion 148 having a diameter intermediate the diameters of portions 142 and 138. The end of arbor 70a is formed with a chamfer 150 which, when the arbors are in abutting relation, forms a tapered shoulder extending between the cylindrical portions 142 and 148. In the arrangement shown in Fig. 3, at least one of the rolls on head 60, the back-up roll, designated 88a, is formed with a cylindrical surface of uniform diameter. Another roll, the form roll, designated 88b, is formed with enlarged cylindrical portions 152 and 154 which are separated by a groove portion 156 provided with angular shoulders 158. At one end, roll 88b is fashioned with a reduced cylindrical portion 160 connected with the portion 152 by a shoulder 162. At its opposite end, roll 88b is fashioned with a groove portion 164 connected with the portion 154 by an angular shoulder 166 at one side and with a slightly enlarged cylindrical portion 168 at the other side by an angular shoulder 170. The reduced portions 156, 160 and 164 are of the same diameter; between these portions on the one hand and the enlarged portions 152 and 154 on the other hand corresponds to the difference in diameter between the portions 138 and 142 on arbor 68a.

In operation, roll 88a is brought into pressure contact with blank 106; and simultaneously therewith, roll 88b is also advanced radially inwardly into contact with the blank. In this arrangement, there may be either two back-up rolls 88a and one form roll 88b or two form rolls 88b and one back-up roll 88a. Form roll 88b is advanced to the position shown in broken lines, that is, to a position wherein wall portions of the blank are displaced between the cylindrical portion 142 of the arbor 68a and the cylindrical portions 152 and 154 of form roll 88b, and the wall portion at one end of the blank is displaced between the cylindrical portion 138 of arbor 68a and the cylindrical portion 160 of form roll 88b. The shoulders 158, 162, 166 and 170 roll corresponding tapered shoulders on the blank. This operation not only provides the tappet body with the desired configuration but also accurately and concentrically sizes the body both internally and externally so that it can be sized to its final dimensions with a minimum of grinding.

Figure 4:
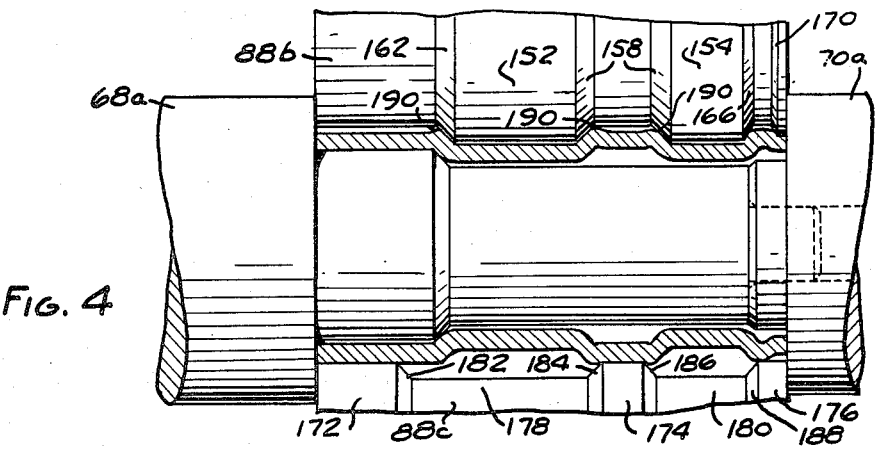
Figs. 4 and 5 show progressive stages of rolling the outer body member of the tappet by means of a different set of rolls.
Figure 5:
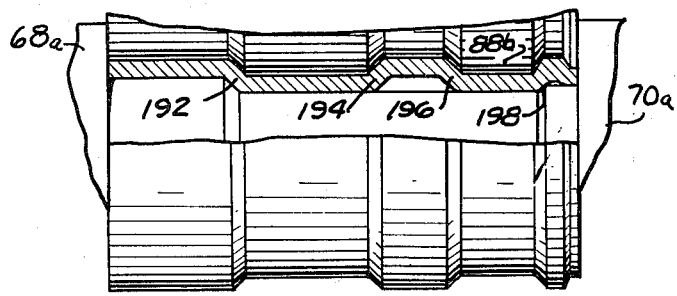
Figure 6:
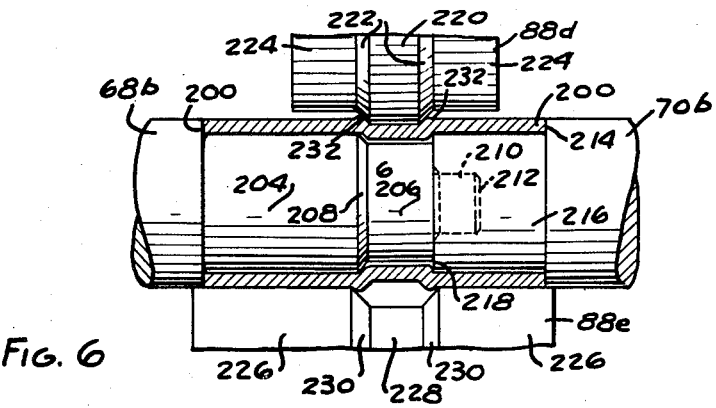
Fig. 6 and 7 show progressive stages of rolling the inner or plunger member of the tappet with rolls which operate on the same principle as those shown in Figs. 4 and 5.
Figure 7:
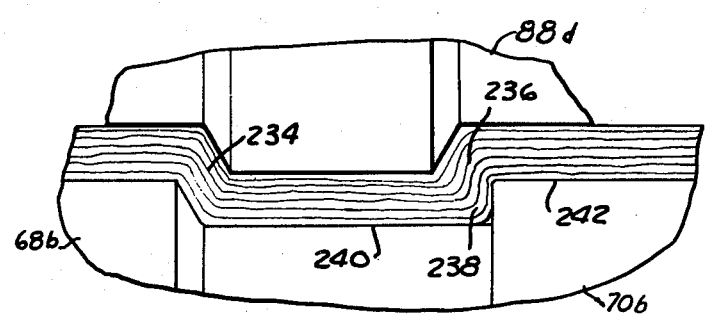

In Figs. 4 through 7 is shown a modified form of rolls for rolling the body 10 and the plunger 14 of the tappet. Figs. 4 and 5 illustrate the rolling of the tappet body and Figs. 6 and 7 illustrate the rolling of the tappet plunger. In the showing of Figs. 4 and 5, the form roll is of the same configuration as shown at 88b in Fig. 3. However, the back-up roll 88c is shaped differently than the back-up roll 88b in Fig. 3. Back-up roll 88c is fashioned with cylindrical portions 172, 174 and 176. Intermediate these cylindrical portions, the back-up roll is provided with cylindrical groove portions 178 and 180 which are connected with the larger cylindrical portions by tapered shoulders 182, 184, 186 and 188. It will be observed that the grooved or relieved portions 178 and 180 are generally aligned with, but of greater axial extent than, the enlarged cylindrical portions 152 and 154 of form roll 88b. In the arrangement shown, there may be two form rolls 88b and one back-up roll 88c or one form roll 88b and two back-up rolls 88c. In either event, when the rolls are brought into pressure contact with the blank and roll 88b fed radially inwardly to displace portions of the wall of the blank inwardly, it has been found that there is a tendency for the metal adjacent the shoulders 158, 162, 166 and 170 to build up and flow radially outwardly and axially of the blank. Thus, the metal builds up slightly as at 190 adjacent each of the aforementioned shoulders. However, since the back-up roll 88c is relieved as shown and is in pressure contact with the wall of the blank, the cylindrical portions 172 and 174 axially confine these built up corner portions 190. Thus, when roll 88b is advanced radially inwardly to its final position shown in Fig. 5, the metal in these built up portions 190 is flowed back into the annular shoulders 192, 194, 196 and 198 of the tappet body; and these annular shoulders are thus sharply defined. Without the relieved back-up roll 88c, there would be a greater tendency for the metal in the blank to flow axially and the blank would be subjected to considerably more cold working in order to produce the finished shape shown in Fig. 5 wherein the blank is accurately and concentrically sized to require a minimum of grinding to produce the finished dimensions of the body member of the tappet.

The arrangement shown in Figs. 6 and 7 includes form roll 88d and a back-up roll 88e that may be employed for rolling a blank 200 into the desired configuration of the plunger 14 of the tappet assembly. In this arrangement, the arbor 68b is fashioned with a shoulder 200, a cylindrical portion 204 which corresponds to the internal diameter of the blank and a reduced cylindrical portion 206 which corresponds with the internal diameter of the portion 32 of the plunger. The portions 204 and 206 are connected by a tapered annular shoulder 208. At its end, arbor 68b is formed with a pilot 210 which engages with a socket 212 in the other arbor 70b. Arbor 70b is also formed with a shoulder 214 and a cylindrical portion 126 which corresponds with the internal diameter of the blank. The end face of arbor 70b cooperates with the cylindrical portion 216 to form a sharp shoulder 218 which extends radially between the portions 206 and 216. Form roll 88d is fashioned with an enlarged cylindrical portion 220 which is connected by shoulders 222 with reduced cylindrical portions 224. The enlarged portion 220 of roll 88d is aligned generally axially with the reduced portion 206 of arbor 68b. Back-up roll 88e is provided with a cylindrical surface 226 which is relieved as at 228. The relieved portion 228 is connected with the cylindrical portions 226 by tapered shoulders 230. It will be observed that the relieved portion 228 together with the shoulders 230 are generally axially aligned with the portion 220 and shoulders 222 of form roll 88d, but the relieved portion 228 is of greater axial extent than the portion 220 and shoulders 222 of the roll 88d.

The operation with the rolls shown in Fig. 7 is generally the same as that described with reference to Figs. 4 and 5. The back-up roll 88e is brought into pressure contact with the blank 200 and the form roll 88d is advanced radially inwardly. As the portion 220 displaces the wall of the blank inwardly, portions of the metal build up at shoulders 222 as at 232 and these built up portions 232 tend to flow axially towards opposite ends of the blank. However, the relieved portion of the back-up roll 88e confines this axial flow of the metal in an axial direction. Thus, when form roll 88d is advanced inwardly to its final position shown in Fig. 7, the excess metal at the built up portions 232 is flattened out by the cylindrical portions 224 and displaced into the annular shoulder portions 234 and 236 of the plunger body. It will be observed that this excess metal is caused to flow axially and radially inwardly and is thus upset to produce a sharp inner contour of the shoulder 238 in conformance with the shoulder 218 on arbor 70b. However, no shortening of the blank axially occurs. The tappet plunger 14 is thus not only formed with sharp annular shoulders but is also accurately and concentrically sized by means of the described rolling operation. As a matter of fact, experience has shown that by forming the tappet plunger member in this manner, the inner surfaces, particularly at 240 and 242, are sufficiently smooth and of accurate dimension so that no grinding is necessary to size the plunger for the reception of push rod seat 16. In this connection, experience has also shown that the bodies 10 and plungers 14 can be successfully rolled in the described manner when three form rolls such as shown at 88b or 88d are employed without any back-up rolls.

After the tappet body 10 and tappet plunger 14 are rolled to the desired configuration as described, they are subjected to a minimum of grinding on their outer surfaces to accommodate them for a welding fixture. The end pieces 12 and 18, as the case may be, are then welded thereto. Subsequent to welding these members, the weld flash may be removed and body 10 counterbored to form the sharp scraping edges at 40 and 42. The work pieces then may be carburized and heat treated. Thereafter, the outer surfaces are ground by a centerless grinding operation. In the case of the body 10, the final operation is the grinding of the inner surface.

Figure 15:
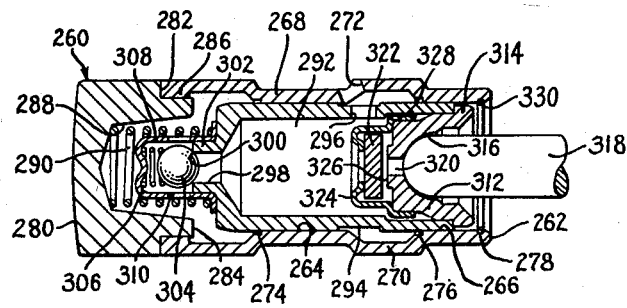
Fig. 15 shows a modified form of valve tappet assembly in axial section.
Figure 8:
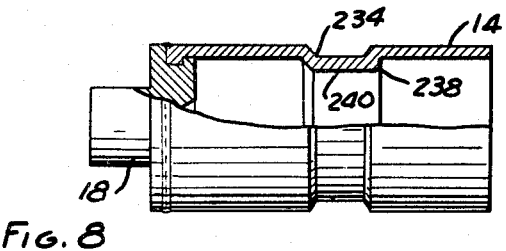
Fig. 8 shows the rolled plunger member with the base or cap welded to one end thereof.

An alternate form of hydraulic valve lifter or tappet is shown in Fig. 15 wherein certain of the rolling operations are simplified and other features are provided. In this form of the invention, a composite body 260 forms a generally cup shaped cylinder similar to that of Fig. 9 and includes a tubular portion 262 which is preferably formed by the rolling previously described. If desired, the rolling may be accomplished by a plurality of identical form rolls such as rolls 88b and without the use of back-up rolls. The form rolls may have their cylindrical sections 154 extend all the way to the end without the provision of the groove 170. Likewise, the arbor 70a may be constructed without the shoulder which abuts the shoulder 198. Thus, the tubular body part 262 may be rolled to provide the two cylindrical land portions 264 and 266 which are rolled into contact with the arbor for sizing to close limits with a cold worked and compacted inner surface and with the grain running substantially parallel to the inner and outer surfaces. Similarly, the intermediate larger diameter cylindrical land portions 268 and 270 have their outer surfaces compacted and sized by the forming rollers to close tolerances. An inclined hole 272 is punched in the wall of the tube to provide an inlet passage for oil from the usual oil galley in an engine block, not shown. It is preferably located so as to be at the highest point of communication with the galley in use so that any air may be quickly drawn off. The inner edges of the lands 264 and 266 are provided with sharp corners by machined grooves 274 and 276 to minimize the entrance of dirt to the sealing clearances of the lifter. A retainer groove 278 may also be machined in the inner surface of land 266.

The body includes an end piece 280 which is preferably formed of hardenable alloy cast iron having suitable wear characteristics for service as a cam follower rubbing surface. The end piece 280 has a shoulder 282 which abuts the end of the tubular part 262 and is secured thereto, as by fusion welding, brazing, or otherwise. It is preferred to form a telescoping, ring-like extension 284 integrally with the end piece. The end portion of the tubular part 262 may be upset inwardly as shown at 286 to tightly embrace the extension 284 mechanically so as to form a seal, or dam, to block any flow of molten metal to the inside of the body. This upsetting may be done as a separate operation after the rolling, and prior to securing the end piece onto the tubular part. Preferably, however, the upsetting is performed at the same time as the fusing of the two pieces. The end piece has a cylindrical recess 288 which forms a centering for a spring 290. The inner end of the extension 284 may also form an abutment for a plunger about to be described.

Slidably mounted in the cylindrical recess formed by lands 264 and 266 is a plunger 292. The plunger may be formed by turning and boring from solid stock after which it may be carburized and hardened and ground to a close sliding fit with no lands 264 and 266. An external groove 294 registers with the internal groove formed by land 270 and may be provided with an oil hole 296 for delivering oil from the galley to the interior of the tappet plunger 292.

At its inner end the plunger is provided with a central hole 298 terminating in a valve seat 300 formed on the end of small cylindrical boss 302. A ball check valve 304 is held on the seat by a light spring 306 which in turn is held in place by a retainer cap 308 having slits 310 for passage of oil. The retainer is a tight frictional fit on the boss 302 and also is held in position by the spring 290 which abuts the base flange of the retainer.

Seated in the open right hand end of plunger 292 is a push-rod seat 312 having a flange 314 which abuts the end of the plunger and a special socket 316 for reception of a push rod 318. If desired, the oil supplied to the inside of the plunger may be utilized to lubricate the valve train parts, not shown, through a hole 320 in the seat 316 and a hole in the push rod. The rate of flow may be controlled by a disc valve 322 held loosely in place by a retainer 324 and engageable by the reciprocating motion of the tappet with a cylindrical or other slightly imperfect seat 326. An internal shoulder 328 may be provided in the plunger to prevent misplacement of the retainer 324. The plunger, spring, retainers, and push rod seat are held in place after assembly by a snap ring 330.

It has been discovered that the forming of the body and plunger members to the desired configuration by the rolling operations described produces results not obtained when these members are machined to the desired configuration. When rolled to the desired shape as described, the distortion of the work pieces during heat treatment is substantially less than when the pieces are machined to the desired shape. This means that with the present invention, the work pieces can be rolled to dimensions much closer to the final dimensions than is the case with machined work pieces. Since the distortion is less, the amount of stock necessary to compensate for out-of-roundness is reduced to a minimum and the final grinding operations are also reduced to a minimum. Not only is this cost saving effected, but also a higher degree of accuracy is obtained in the size range of the finish ground pieces. Because there is less stock to remove in final grinding, the deflections in the grinding machine parts are less and the machines are thus able to hold the range of size of a sequence of finished parts to a much narrower limit than otherwise.

When it is considered that the production requirements of such tappet assemblies run into many thousands per day, it will be appreciated what this savings amounts to both from the standpoint of time and capital investment. Since more pieces can be turned out per hour on a grinder when the tappet member is formed in accordance with the present invention, less grinding machines are necessary. In the case of internal grinding machines in particular, the present invention can effect a savings of hundreds of thousands of dollars in capital expense.

Figure 11:
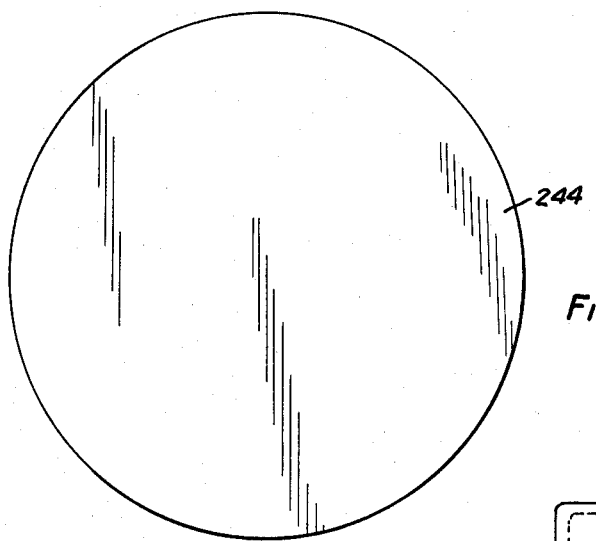
Fig. 11 shows a flat metal disc which may be used as a starting blank in forming one of the tubular members of the valve tappet.
Figure 12:
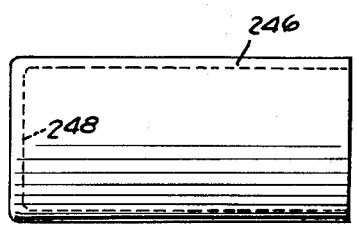
Fig. 12 shows a close ended tubular blank drawn from the disc illustrated in Fig. 11.
Figure 13:
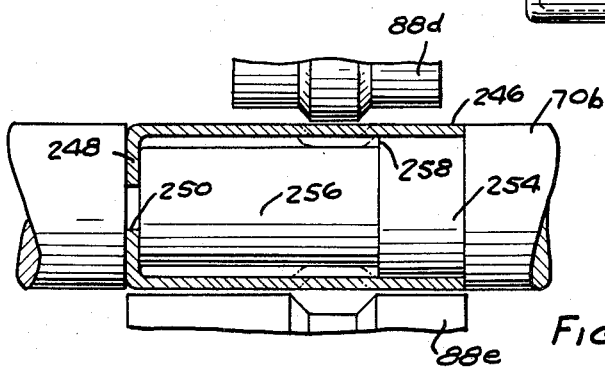
Fig. 13 shows the operation of rolling the blank of Fig. 12 into a tubular plunger in accordance with the present invention.
Figure 14:
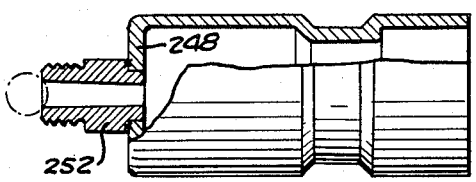
Fig. 14 shows the rolled plunger member of Fig. 13 with the valve fitting welded to the end wall thereof.

As a further step in the direction of economy, the invention also contemplates the forming of the tubular blank for the body member or plunger member of the tappet assembly from a flat blank 244 such as shown in Fig. 11. The blank 244 is fashioned into the cup-shaped blank 246 by a conventional deep drawing operation. In the case of the plunger body 10, the bottom wall 248 is removed from blank 246; and in the case of the plunger member 14, the bottom wall 248 is merely punched to provide an opening 250 in which the check valve fitting 252 may be welded after rolling. The rolling operation of these members is substantially the same as in the case of the plunger 14. Since the blank is substantially closed at one end, the arbor 70b extends the full length of blank 246 and is provided with a cylindrical portion 254 which corresponds to the internal diameter of the blank and a reduced cylindrical portion 256 which corresponds to the internal diameter of the portion 32 of the finished plunger 14. These two portions of the arbor are connected by a sharp, radially inwardly extending shoulder 258. The form roll 88d and the back-up roll 88e are the same as illustrated with respect to the showing in Figs. 6 and 7. However, as is the case with the previous embodiment shown, the back-up roll may be a plain cylindrical roll such as shown at 88e in Fig. 3 or the back-up roll may be eliminated entirely; and in place thereof, three form rolls such as shown at 88d may be employed.

Regardless of whether the initial blank is a tubular blank such as shown at 106 in Fig. 3 or a flat blank as at 244 in Fig. 11, the finished tappet member formed by the rolling method described herein has a distinguishing feature which probably accounts for the fact that when tappet members formed in accordance with the present invention are heat treated, the distortion encountered is very slight. This feature has to do with the grain structure of the wall of the tappet member. By rolling the tubular blank into the desired configuration of the tappet member, the grain of the metal extends continuously from one end of the member to the other. This distinguishes the tappet member of the present invention quite readily from those which are formed by machining a blank to the desired configuration. In the latter case, the grain of the metal extends axially of the member but is interrupted at the various shoulders. In the tappet formed in accordance with the instant method, the grain extends quite continuously and uninterruptedly from one end of the blank to the other in the manner somewhat illustrated in Fig. 7. At the shoulders 234 and 236, the grain is somewhat elongated due to the manner in which these shoulders are formed; and at the corner 238, the grain is not only compressed but distorted as well. At the inner and outer surfaces where the metal is subjected to considerable working, the grain is compacted as well.

I claim:

1. A composite tappet member for a hydraulic valve lifter comprising a tubular body member having two pairs of axially adjacent straight cylindrical portions of large and smaller diameters respectively with connecting portions of generally annular shape, all of said portions having a common longitudinally extending grain structure generally paralleling the inner and outer walls of each portion, and being compacted adjacent the inner surface of the small diameter cylindrical portion to provide a close-grained rubbing surface to engage a sliding plunger and a closure for one end of the tubular body comprising a button having a flange abutting the end of the tubular body with a smaller diameter portion telescoped into the tubular body.

2. A composite tappet member for a hydraulic valve lifter comprising a tubular body member having two pairs of axially adjacent straight cylindrical portions of large and smaller diameters respectively with connecting portions of generally annular shape, all of said portions having a common longitudinally extending grain structure generally paralleling the inner and outer walls of each portion, and being compacted adjacent the inner surface of the small diameter cylindrical portion to provide a close-grained rubbing surface to engage a sliding plunger and a closure for one end of the tubular body comprising a cast iron button having a flange abutting the end of the tubular body with a smaller diameter portion telescoped into the tubular body.

3. A composite tappet member for a hydraulic valve lifter comprising a tubular body member having two pairs of axially adjacent straight cylindrical portions of large and smaller diameters respectively with connecting portions of generally annular shape, all of said portions having a common longitudinally extending grain structure generally paralleling the inner and outer walls of each portion, and being compacted adjacent the inner surface of the small diameter cylindrical portion to provide a close-grained rubbing surface to engage a sliding plunger and a closure for one end of the tubular body comprising a button having a flange abutting the end of the tubular body with a smaller diameter portion telescoped into the tubular body, said tubular body and button being united by fusion.

4. A composite tappet member for a hydraulic valve lifter comprising a tubular body member having axially adjacent portions of large and smaller diameters respectively with connecting portions of generally annular shape, all of said portions having a common longitudinally extending grain structure generally paralleling the inner and outer walls of each portion, and being compacted adjacent the inner surface of the small diameter cylindrical portion to provide a close-grained rubbing surface to engage a sliding plunger and a closure for one end of the tubular body comprising a button having a flange abutting the end of the tubular body with a smaller diameter portion telescoped into the tubular body, a plunger of generally cylindrical form slidably fitting said smaller diameter portion and means for trapping oil between the plunger and the closed end of the body.

5. A composite tappet member for a hydraulic valve lifter comprising a tubular body member having two pairs of axially adjacent straight cylindrical portions of large and smaller diameters respectively with connecting portions of generally annular shape, all of said portions having a common longitudinally extending grain structure generally paralleling the inner and outer walls of each portion and being compacted adjacent the inner surface of the small diameter cylindrical portion to provide a close-grained rubbing surface to engage a sliding plunger and means integral with one end of the tubular body forming a closure and a cam follower rubbing surface.

6. A composite tappet member for a hydraulic valve lifter comprising a tubular body member having axially adjacent portions of large and smaller diameters respectively with connecting portions of generally annular shape, all of said portions having a common longitudinally extending grain structure generally paralleling the inner and outer walls of each portion, and being compacted adjacent the inner surface of the small diameter cylindrical portion to provide a close-grained rubbing surface to engage a sliding plunger and means closing one end of the tubular body and a plunger slidable along the cylindrical surface of small diameter to form a hydraulic pressure chamber at the closed end of the body.

7. A composite tappet member for a hydraulic valve lifter comprising a tubular body member having two pairs of axially adjacent straight cylindrical portions of large and smaller diameters respectively, including two large diameter cylindrical portions forming spaced outside bearing surfaces and two small diameter cylindrical portions forming spaced inside bearing surfaces with connecting portions of generally annular shape, all of said portions having a common longitudinally extending grain structure generally paralleling the inner and outer walls of each portion, and being compacted adjacent the inner surface of the small diameter cylindrical portion to provide close-grained rubbing surfaces to engage a sliding plunger and a closure for one end of the tubular body comprising a button having a flange abutting the end of the tubular body with a smaller diameter portion telescoped into the tubular body.

8. A composite tappet member for a hydraulic valve lifter comprising a tubular body member having two pairs of axially adjacent straight cylindrical portions of large and smaller diameters respectively, including two large diameter cylindrical portions forming spaced outside bearing surfaces and two small diameter cylindrical portions forming spaced inside bearing surfaces with connecting portions of generally annular shape, all of said portions having a common longitudinally extending grain structure generally paralleling the inner and outer walls of each portion, and being compacted adjacent the inner surface of the small diameter cylindrical portion to provide close-grained rubbing surfaces to engage a sliding plunger and means integral with one end of the tubular body forming a closure and a cam follower rubbing surface.

References Cited in the file of this patent

UNITED STATES PATENTS

| | | |
|---|---|---|
| 2,645,215 | Moser | July 14, 1953 |
| 2,865,352 | Thompson | Dec. 23, 1958 |